United States Patent
Chaparro et al.

(10) Patent No.: US 7,330,983 B2
(45) Date of Patent: Feb. 12, 2008

(54) TEMPERATURE-AWARE STEERING MECHANISM

(75) Inventors: Pedro Chaparro, La Garriga (ES); Jose Gonzalez, Terrassa (ES); Antonio Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 359 days.

(21) Appl. No.: 10/867,453

(22) Filed: Jun. 14, 2004

(65) Prior Publication Data

US 2005/0278555 A1 Dec. 15, 2005

(51) Int. Cl.
*G06F 1/00* (2006.01)
*G06F 9/46* (2006.01)

(52) U.S. Cl. .................. 713/300; 713/324; 718/100

(58) Field of Classification Search ............... 713/300, 713/320, 324, 340; 718/102, 100; 702/130; 712/34
See application file for complete search history.

(56) References Cited

U.S. PATENT DOCUMENTS

| | | | | |
|---|---|---|---|---|
| 5,502,838 | A * | 3/1996 | Kikinis | 713/501 |
| 6,000,036 | A * | 12/1999 | Durham et al. | 713/320 |
| 6,049,883 | A * | 4/2000 | Tjandrasuwita | 713/322 |
| 6,542,835 | B2 * | 4/2003 | Mundt | 702/65 |
| 7,100,060 | B2 * | 8/2006 | Cai et al. | 713/320 |
| 2002/0087903 | A1 * | 7/2002 | Hermerding et al. | 713/320 |
| 2005/0262270 | A1 * | 11/2005 | Latorre et al. | 710/1 |

OTHER PUBLICATIONS

Hennessy John L. et al., Computer Organization and Design: The Handware/Software Interface, 1998, Morgan Kaufmann Publishers, Inc., Second Ed., pp. 336-350.*
Hennessey et al., Computer Organization and Design: The Hardware/Software Interface, 1998, Morgan Kaufmann Publishers Inc., 2nd Ed., pp. 441-442.*
R. Balasubramonian et al. "Dynamically Managing the Communication Parallelism Trade-off in Future Clustered Processors". Proceedings of the International Symposium on Computer Architecture, 2003.
R. Canal et al. "Dynamic Cluster Assignment Mechanisms". Proceedings of the International Symposium on High Performance Computing, 2000.
S. Heo et al. "Reducing Power Density through Activity Migration". International Symposium on Low Power Electronics and Design. 2003.
Intel Corporation "Intel Pentium 4 Processor with 5120KB L2 Cache on 0.13 Micron Process Thermal Design Guidelines". Document No. 252161-001, Nov. 2002.

* cited by examiner

*Primary Examiner*—Mark Connolly
(74) *Attorney, Agent, or Firm*—Blakely, Sokoloff, Taylor & Zafman LLP

(57) ABSTRACT

According to one embodiment a CPU is disclosed. The CPU includes two or more clusters and a dispatch unit coupled to the two or more clusters. The dispatch unit steers instructions to the two or more clusters based upon the temperature of each of the clusters.

26 Claims, 7 Drawing Sheets

TEMPERATURE-AWARE STEERING MECHANISM

FIELD OF THE INVENTION

The present invention relates to microprocessors; more particularly, the present invention relates to clustered microarchitectures.

BACKGROUND

Power dissipation is becoming one of the major hurdles in the design of next-generation processors. Power density is increasing in each generation. Such power density is translated into heat generation. The cost of removing this heat increases at the same rate as power density. Meanwhile, in order to reduce dynamic power consumption, supply voltage is also reduced. To counteract its negative effect on transistor switching delay, the threshold voltage is scaled accordingly. However, lowering threshold voltage has a significant impact on leakage power, which is highly dependent on temperature.

Clustered micro-architectures are thermal-effective. This is because distributing processor resources also helps distributing power dissipation and temperature. Nevertheless, maximum temperatures that occur at clustered micro-architectures may still result in significant cooling costs. Further, maximum temperatures at clustered micro-architectures may result in increased average temperatures.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A temperature steering mechanism for a clustered microarchitecture is described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
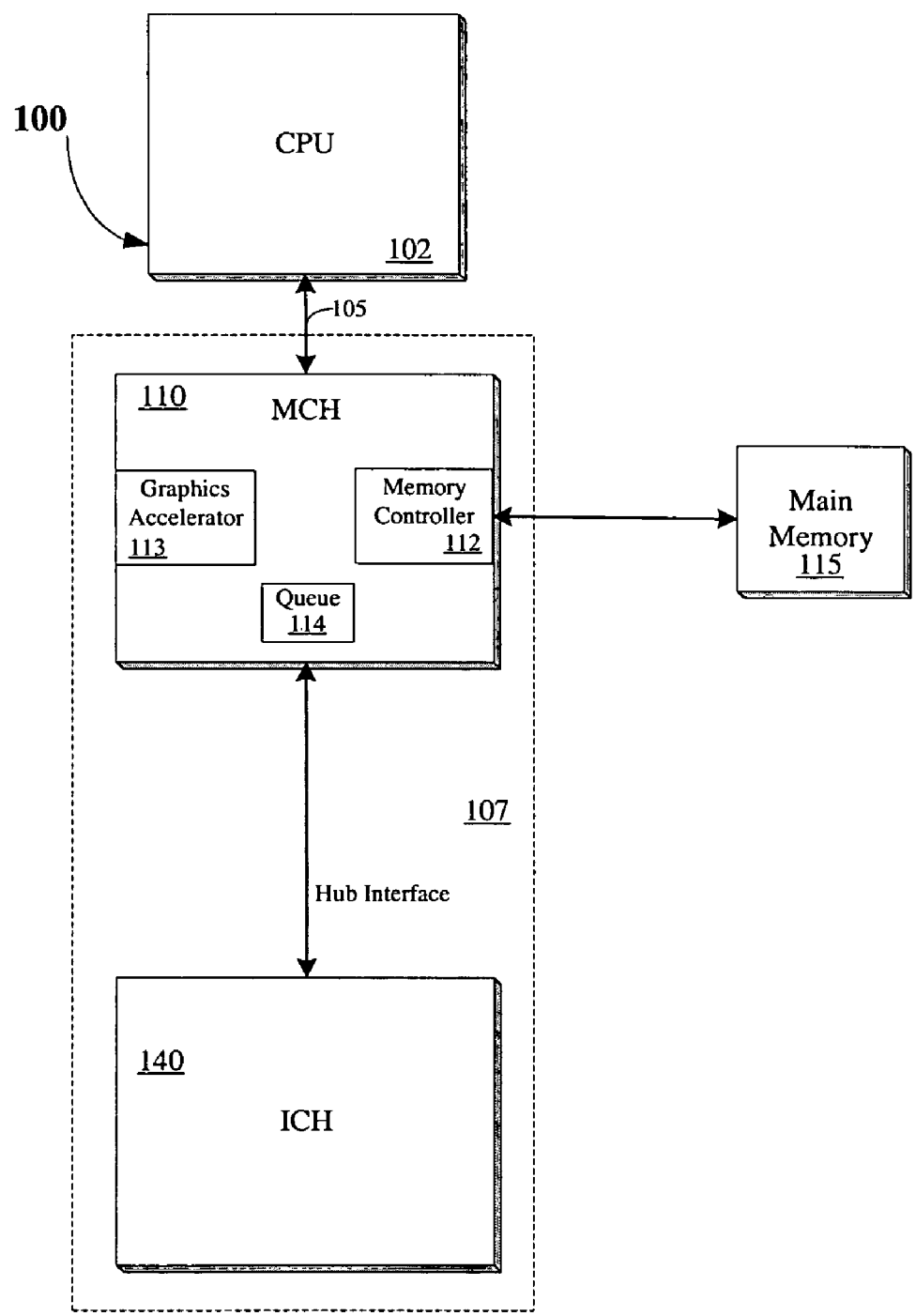
FIG. 1 illustrates one embodiment of a computer system.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

A chipset 107 is also coupled to bus 105. Chipset 107 includes a memory control hub (MCH) 110. In one embodiment, MCH 110 is coupled to an input/output control hub (ICH) 140 via a hub interface. ICH 140 provides an interface to input/output (I/O) devices within computer system 100. For instance, ICH 140 may be coupled to a Peripheral Component Interconnect bus adhering to a Specification Revision 2.1 bus developed by the PCI Special Interest Group of Portland, Oreg.

In one embodiment, MCH 110 includes a memory controller 112 that is coupled to a main system memory 115. Main system memory 115 stores data and sequences of instructions and code represented by data signals that may be executed by CPU 102 or any other device included in system 100. In one embodiment, main system memory 115 includes dynamic random access memory (DRAM); however, main system memory 115 may be implemented using other memory types.

MCH 110 also includes a graphics accelerator 113 to compute graphical transformations. In one embodiment, graphics accelerator 113 includes a 2D/3D instruction processing unit to control 2D and 3D graphics engines. The 2D and 3D graphics engines transmit data to and receives data from main memory 115 via memory controller 112.

In addition, MCH 110 includes a queue 114 to facilitate the interaction between memory 115 and memory controller 112. Queue 114 stores information (e.g., data, command information) from graphics accelerator 114 prior to the information being presented to memory 115. Although described herein with reference to a graphics accelerator/memory interface, one of ordinary skill in the art will appreciate that queue 114 may be implemented for other interfaces.

Figure 2:
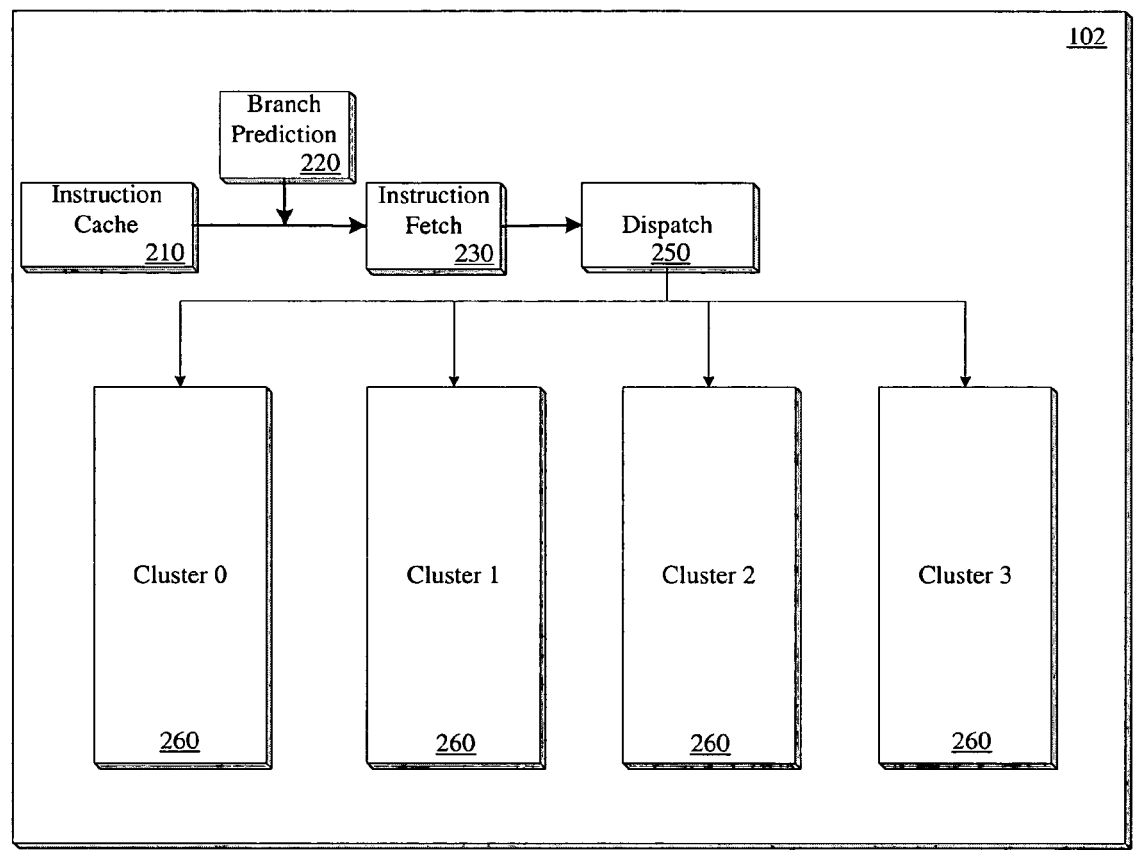
FIG. 2 illustrates one embodiment of a CPU.

FIG. 2 illustrates one embodiment of CPU 102. CPU 102 includes instruction cache 210, branch prediction unit 220, instruction fetch unit 230, dispatch unit 250 and clusters 260. Instruction cache 210 is implemented to store instructions that are to be fetched and executed. Branch prediction unit 220 is coupled to instruction cache 210, and is used to predict instructions to be executed that are dependent from instructions that are currently executed. For example, a predicted instruction may be a conditional branch of an instruction being executed.

Instruction fetch unit 230 retrieves instructions from instruction cache 210 and forwards the instructions to dispatch unit 250. Dispatch unit 250 decodes, renames and steers fetched instructions to a cluster 260, which produces operands. Clusters 260 are implemented to execute instructions steered by dispatch unit 250. In one embodiment, CPU 102 includes cluster 0-cluster 3.

In conventional dispatch units for clustered microarchitectures, instructions are steered to a cluster 260 based upon register dependencies and workload balance. However according to one embodiment of the invention, dispatch unit 250 steers instructions to clusters 260 based upon thermal information that is used to make steering decisions. In such an embodiment, schemes to decide the destination cluster 260 of each instruction (e.g., steering scheme) takes into account the temperature of each cluster 260. The steering schemes can be applied alone or in combination with cluster hopping schemes to further increase efficiency. Cluster hopping refers to an architectural feature that disables one or more of the clusters during a time interval in order to not dissipate power and to reduce temperature. The designated $V_{dd}$-gated clusters are rotated in order to alternate the active and disabled clusters. The steering schemes and cluster hopping schemes are described in greater detail below.

Figure 3:
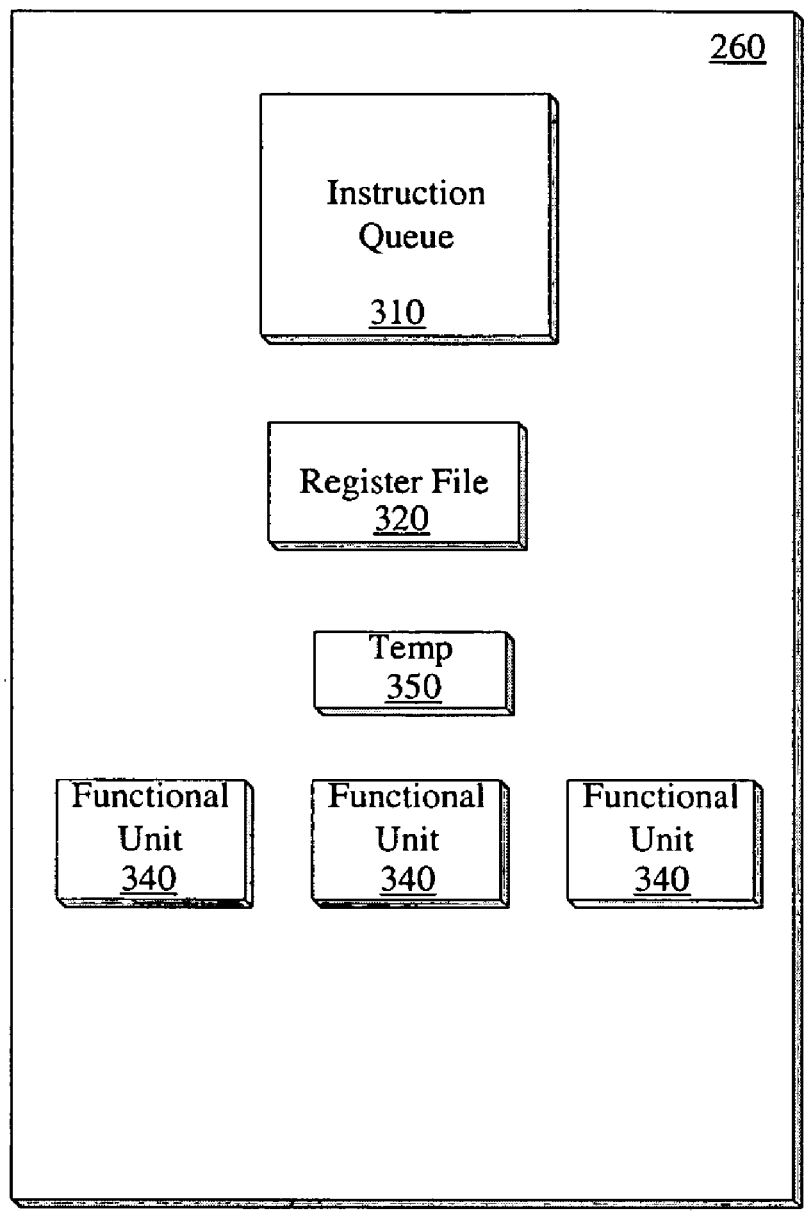
FIG. 3 illustrates one embodiment of a cluster.

FIG. 3 illustrates one embodiment of a cluster 260 used to execute instructions steered by dispatch unit 250 to cluster 260 based on thermal information. Cluster 260 includes one or more instruction queues 310, register files 320 and functional units 240. Instruction queue 310 temporarily stores instructions before they are forwarded to functional units 240 for execution.

Register file 320 stores the results of instructions executed at functional units 340. In addition, register file 320 may provide such results back to functional units 340 for the execution of subsequent instructions. Functional units 340 are implemented to execute instructions. For example, functional units 340 may include ALU's and FP execution units to execute instructions.

According to one embodiment, a temperature sensor 350 is included within each cluster 260. Temperature sensor 350 measures the temperature of a cluster 260 to determine the magnitude of heat being generated. In a further embodiment, the values measured by a temperature sensor 350 is transmitted to dispatch unit 250 for use in determining which cluster 260 to forward impending instructions.

Figure 4:
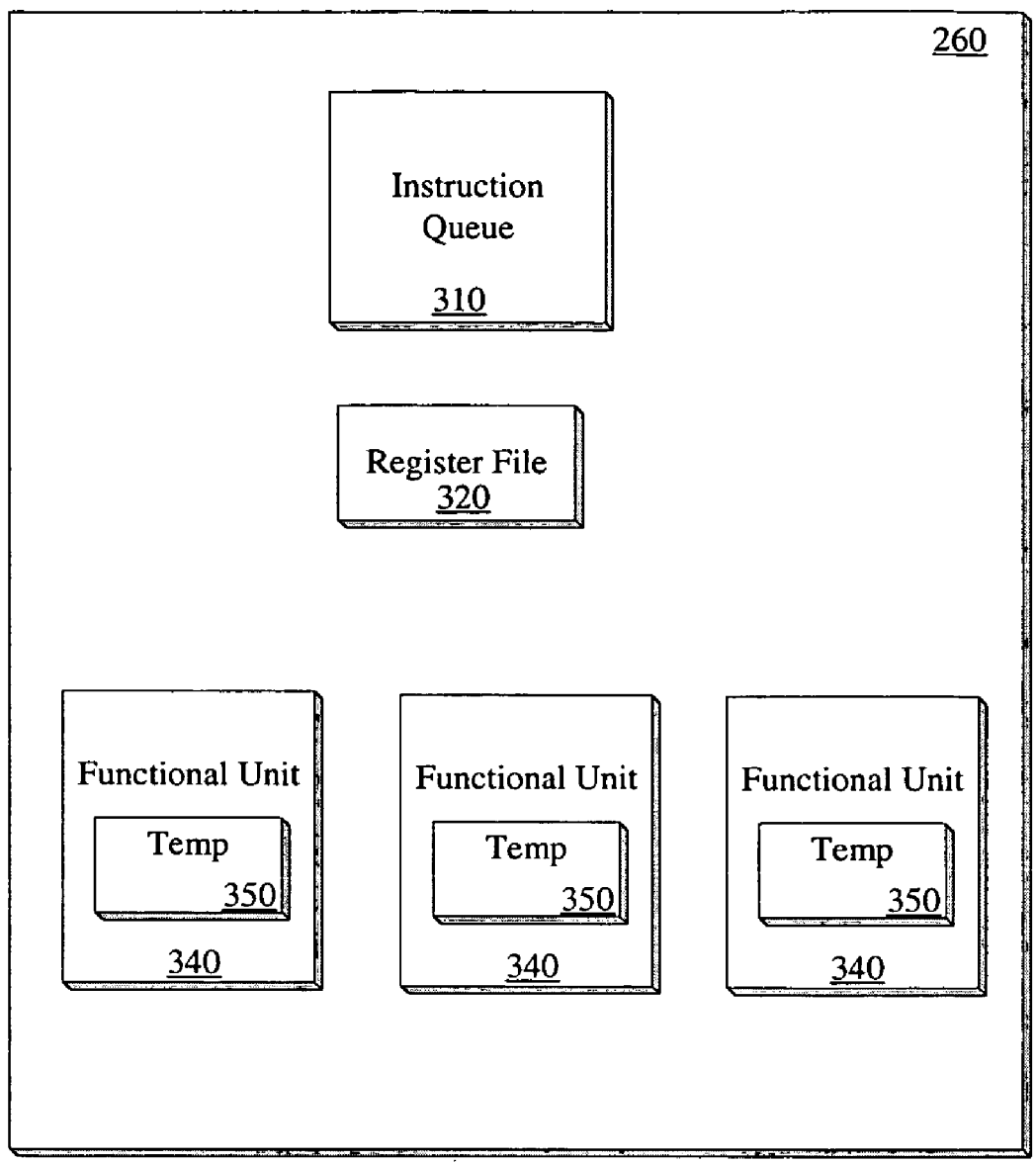
FIG. 4 illustrates another embodiment of a cluster.

FIG. 4 illustrates another embodiment of a cluster 260. In this embodiment, a temperature sensor 350 is included within each of the functional block. In such an embodiment, more accurate temperature readings are provided to dispatch unit 250. For instance, since dispatch unit 250 receives the actual temperature of each functional block within a cluster 260, dispatch unit 250 may better determine the temperature of cluster 360.

Such a decision may be based upon the averaging of the received temperature values by dispatch unit 250 to determine the cluster with the highest temperature. However, in other embodiment, dispatch unit 250 may base the decision on the highest temperature value received from a functional unit 340 within any particular cluster 260.

Figure 5:
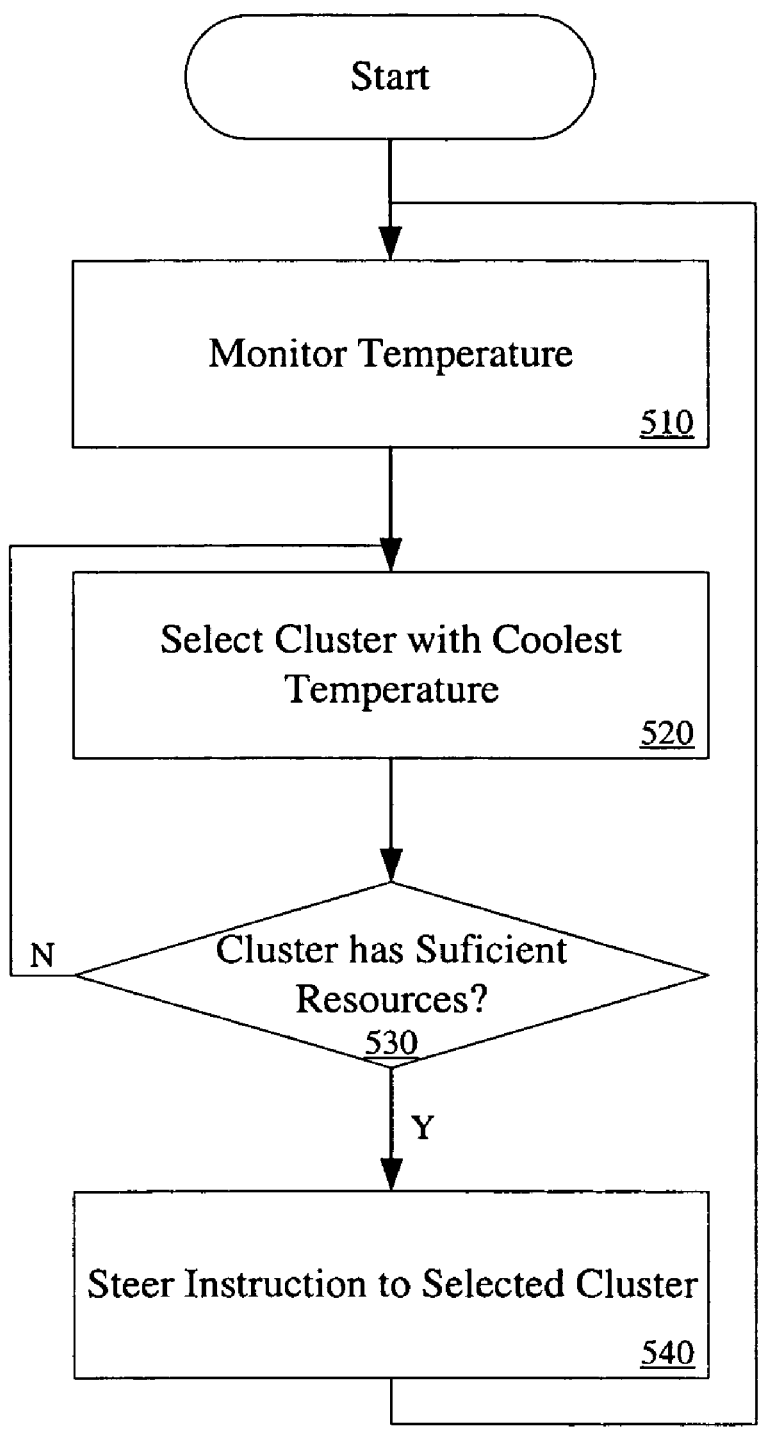
FIG. 5 is a flow diagram illustrating one embodiment of operating a clustered CPU via a cold scheme.

FIG. 5 is a flow diagram illustrating one embodiment of operating CPU 102 via a cold scheme. At processing block 510, dispatch unit 250 monitors every temperature sensor 350 within each cluster 260. In one embodiment, the clusters 260 are ordered in a priority list indicating the clusters 260 having the coolest temperatures. At processing block 520, dispatch unit 260 selects the cluster 260 having the coolest temperature measurement(s). In the cold scheme, dispatch unit 250 orders the priority of clusters 260 based upon their respective temperatures. However, one of ordinary skill in the art will appreciate that other orderings may be implemented without departing from the true scope of the invention.

At decision block 530, it is determined whether the cluster 260 with the coolest temperature measurements has sufficient resources to process the instructions to be forwarded. If the cluster 260 does not have sufficient resources, control is forwarded back to processing block 520 where the cluster 260 having the next coolest temperature is determined. If the cluster 260 does have sufficient resources, the instructions are steered to the selected cluster 260.

Table 1 below is used to illustrate an example of the operation of the cold scheme. Table 1 includes a temperature for each cluster 260 and how many of the two inputs are held in the particular cluster 260. In such an example, an instruction I having two inputs. Note that a register value may be replicated in two or more clusters 260.

TABLE 1

| Cluster | Temperature | Input Operands |
|---|---|---|
| 0 | 82° C. | 1 |
| 1 | 80° C. | 2 |
| 2 | 88° C. | 2 |
| 3 | 81° C. | 0 |

For the cold scheme, it is determined that cluster 1 is the coolest cluster 260. As a result, the instruction is forwarded to cluster. If however, cluster 1 does not have sufficient resources, cluster 3 is selected as the cluster 260 to process the instruction.

Figure 6:
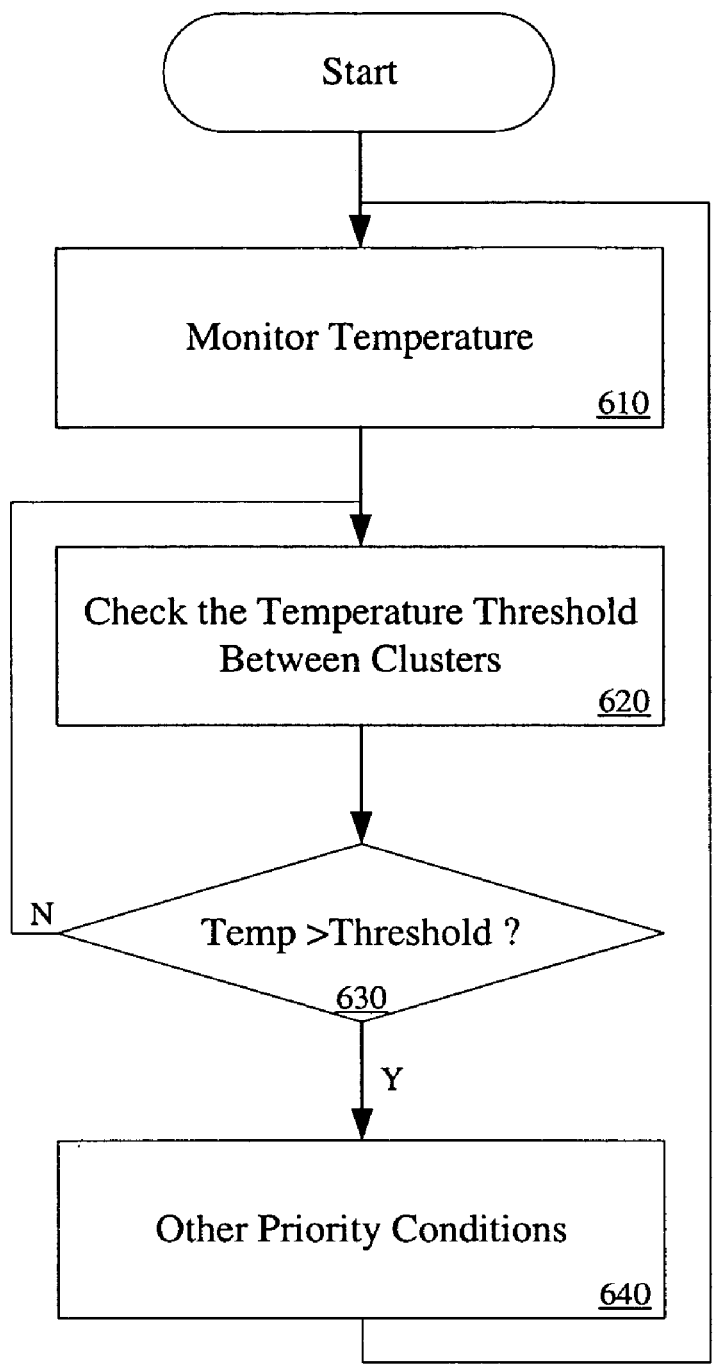
FIG. 6 is a flow diagram illustrating one embodiment of operating a clustered CPU via a thermal scheme.

FIG. 6 is a flow diagram illustrating one embodiment of operating CPU 102 via a thermal scheme. At processing block 610, dispatch unit 250 monitors every temperature sensor 350 within each cluster 260. In one embodiment, the clusters 260 are ordered in a priority list indicating the clusters 260 having the coolest temperatures. At processing block 620, dispatch unit 260 determines which cluster 260 has the coolest temperature measurement(s).

At processing block 630, the temperature difference between each cluster 260 is determined. At decision block 640, it is determined whether the temperature difference between each cluster 260 exceeds a predetermined threshold. In one embodiment, the threshold is 3° C. However, one of ordinary skill in the art will appreciate that other thresholds may be implemented.

If the temperature between any two clusters 260 exceeds the threshold, no swapping between the clusters 260 is performed and control is returned to processing block 630 where the temperature difference between other clusters 260 is determined. If the difference between any two clusters is lower than the threshold, other conditions are checked in order to decide which cluster 260 has a higher priority, processing block 650. For example, the cluster 260 holding the most of the inputs has a higher priority. If the clusters 260 are holding the same number of inputs, the cluster 260 with more free slots in a scheduler (not shown) has a higher priority.

Using Table 1 above to illustrate an example of the operation of the thermal scheme, the clusters 260 are initially ordered as A1=(cluster 1, cluster 3, cluster 0, cluster 2). So, in the example, using a threshold of 3° C., the difference between cluster 1 and cluster 3 is lower than the threshold. Since cluster 1 holds more inputs, cluster 1 has a higher priority than cluster 3. Thus, the clusters are ordered A2= (cluster 1, cluster 3, cluster 0, cluster 2).

The difference between cluster 3 and cluster 0 is also lower than the threshold. Since cluster 0 holds more inputs, cluster 0 has a higher priority than cluster 3. Consequently, the clusters are ordered A3=(cluster 1, cluster 0, cluster 3, cluster 2). The difference between cluster 3 and cluster 2 is higher than the threshold, so cluster 3 has a higher priority than cluster 2. Accordingly, the clusters are ordered A4= (cluster 1, cluster 0, cluster 3, cluster 2), which is the final cluster 260 priority list. According to one embodiment, clusters 260 are probed after creating the priority list in order to hold the instruction being steered.

As discussed above, the steering mechanisms (e.g., cold scheme or thermal scheme) may be combined with a cluster hopping scheme to further increase efficiency. The cluster hopping technique is based on dynamically disabling (e.g., $V_{dd}$-gating) some of the clusters, so that the clusters do not dissipate either dynamic or leakage power.

Cluster hopping benefits temperature control in different ways. For instance, maximum temperature may be reduced since each cluster is disabled during a period of time. In addition, average temperature is also reduced since the energy savings of the disabled cluster(s) is greater than the increase in energy consumption experienced by the rest of active clusters despite, of the slight increase in their activity.

During the period of time that a particular cluster remains disabled, the cluster does not provide any register value and, therefore, before putting a cluster to sleep, the relevant content of the cluster's register file is copied to other active clusters. In particular, a set of copy micro-operations is generated and dispatched to the cluster in order to copy the value of the logical registers whose latest mapping is not present in any other cluster. Each register value is sent to the nearest cluster.

The performance impact of these copies is negligible since clusters are disabled at relatively large intervals. Another important effect of switching off clusters is related to memory. Since $V_{dd}$ is gated, the contents of a local data cache and data TLB are lost and all lines are invalid when the cluster is enabled again (e.g., data caches are write-through, so next level memory always has an up-to-date copy).

Figure 7A:
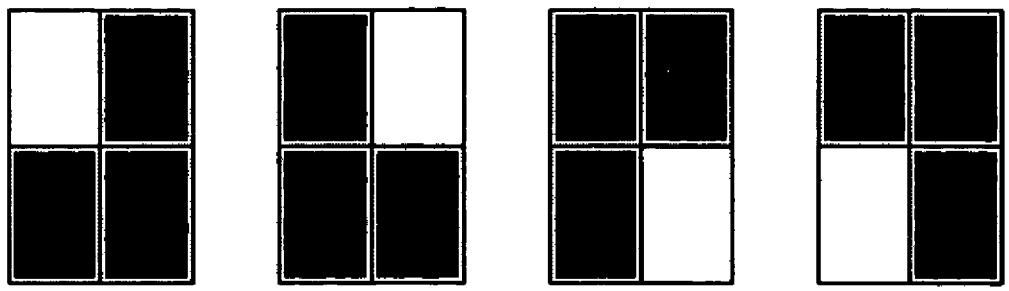
FIG. 7A illustrates one embodiment of a cluster hopping scheme.
Figure 7B:
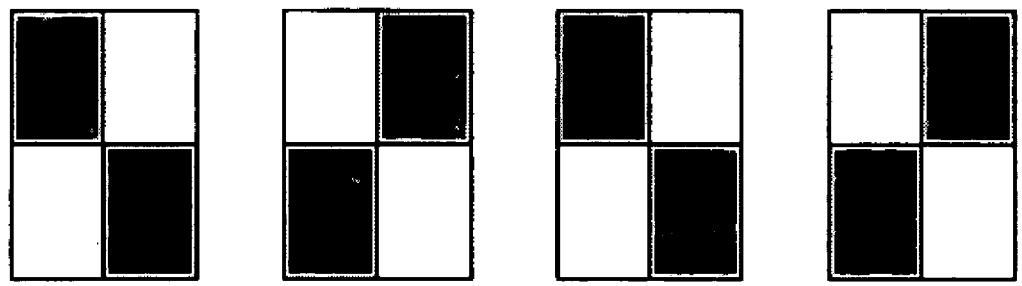
FIG. 7B illustrates another embodiment of a cluster hopping scheme.

FIGS. 7A and 7B illustrate the different phases of the clock-wise hopping schemes where gray squares represent active clusters and white squares represent the gated ones. Other options such as disabling three clusters, disabling two neighbor clusters or disabling either both the two left clusters or the two right clusters are also possible, but do not provide any additional benefit to the schemes presented here.

The above-described steering techniques in combination with cluster hopping resulting in up to a 30% reduction in the leakage of the backend of a clustered CPU and a 5% reduction in peak temperature. Moreover the steering techniques and cluster hopping assists in dealing with two of the main problems that will arise in future processors, the increasing power consumption, especially due to the growing impact of leakage power, and the heat generation derived from this power dissipation.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A central processing unit (CPU) comprising:
    two or more clusters; and
    a dispatch unit, coupled to the two or more clusters, to steer instructions to a first cluster having the lowest temperature if the first cluster has sufficient resources to process the instructions, to determine whether a temperature difference between the first cluster and a second cluster having a second lowest temperature exceeds a predetermined threshold if the first cluster does not have sufficient resources to process the instructions and to steer the instructions to the second cluster if the temperature difference does not exceed the predetermined threshold.

2. The CPU of claim 1 wherein the dispatch unit steers instructions to the second cluster if the temperature difference does not exceed the predetermined threshold and the second cluster holds more inputs.

3. The CPU of claim 2 wherein each cluster includes temperature sensors to measure the temperature at the clusters.

4. The CPU of claim 3 wherein each cluster further comprises:
    one or more instruction queues;
    one or more register files; and
    one or more functional units.

5. The CPU of claim 2 wherein each cluster includes, for some or all functional blocks, a temperature sensor to measure the temperature at the functional block.

6. The CPU of claim 5 wherein each temperature sensor is coupled to the dispatch unit to provide a temperature value of the functional block to the dispatch unit.

7. The CPU of claim 6 wherein the dispatch unit calculates the highest temperature value for each cluster based on the temperature values received from each functional unit temperature sensor associated with each cluster.

8. The CPU of claim 7 wherein the dispatch unit compares an average temperature value from each functional unit temperature sensor within a cluster to determine which cluster has the coolest temperature.

9. The CPU of claim 1 wherein the clusters operate according to a cluster hopping scheme wherein at least one of the clusters is disabled at any time.

10. The CPU of claim 9 wherein the clusters rotate on an interval basis to alternate between active and disabled clusters.

11. The CPU of claim 1 wherein the dispatch unit compares the received temperature values to determine which cluster has the coolest temperature.

12. A method comprising:
    monitoring, at a dispatch unit, a temperature value associated with each of two or more clusters;
    selecting a first cluster that has a temperature value indicating the coolest temperature;
    determining whether the first cluster has sufficient resources to process the instructions;
    forwarding instructions to the first cluster if the first cluster has sufficient resources to process the instructions;
    selecting a second cluster that has a temperature value indicating the second coolest temperature if the selected cluster does not have sufficient resources to process the instructions;
    determining whether the temperature difference between the cluster that has the temperature value indicating the coolest temperature and a cluster that has the temperature value indicating the coolest temperature exceeds a predetermined threshold; and
    forwarding instructions to the cluster that has the temperature value indicating the second coolest temperature if the temperature difference does not exceed the predetermined threshold and the cluster that has a temperature value indicating the second coolest temperature holds more inputs.

13. The method of claim 12 further comprising ordering each of the two or more clusters according to a priority based upon the clusters having the coolest temperature.

14. A computer system comprising:
    a central processing unit (CPU) having a clustered microarchitecture having:
        a first cluster;

a second cluster; and a dispatch unit, coupled to the first cluster and the second cluster, to steer instructions to the first cluster if the first cluster has the lowest temperature and has sufficient resources to process the instructions, to determine whether a temperature difference between the first cluster and the second cluster exceeds a predetermined threshold if the first cluster does not have sufficient resources to process the instructions and to steer the instructions to the second cluster if the temperature difference does not exceed the predetermined threshold.

15. The computer system of claim 14 wherein the second cluster has a second lowest temperature.

16. The computer system of claim 15 wherein the first and second clusters each includes a temperature sensor to measure temperature.

17. The computer system of claim 14 wherein the first and second clusters operate according to a cluster hopping scheme wherein at least one of the clusters is disabled at any time.

18. The computer system of claim 17 wherein the clusters rotate on an interval basis to alternate between active and disabled clusters.

19. The computer system of claim 14 wherein the dispatch unit compares the received temperature values to determine which cluster has the coolest temperature.

20. The computer system of claim 14 wherein CPU further comprises:
an instruction cache;
a branch prediction unit coupled to the instruction cache; and an instruction fetch unit coupled to the instruction cache and the dispatch unit.

21. A computer system comprising:
a central processing unit (CPU) having a clustered microarchitecture having:
a first cluster;
a second cluster; and
a dispatch unit, coupled to the first cluster and the second cluster, to steer instructions to the first cluster if the first cluster has the lowest temperature and has sufficient resources to process the instructions, to determine whether a temperature difference between the first cluster and the second cluster exceeds a predetermined threshold if the first cluster does not have sufficient resources to process the instructions and to steer the instructions to the second cluster if the temperature difference does not exceed the predetermined threshold;
a chipset coupled to the CPU; and
a main memory device coupled to the chipset.

22. The computer system of claim 21 wherein the second cluster has a second lowest temperature.

23. The computer system of claim 22 wherein the first and second clusters each include one or more functional units, each comprising a temperature sensor to measure the temperature at the functional unit.

24. The computer system of claim 23 wherein each temperature sensor is coupled to the dispatch unit to provide a temperature value of the functional unit to the dispatch unit.

25. The computer system of claim 24 wherein the dispatch unit calculates an average temperature value for each cluster based on the temperature values received from each functional unit temperature sensor associated with each cluster.

26. The computer system of claim 25 wherein the dispatch unit compares the average temperature values to determine which cluster has the coolest temperature.

* * * * *